(12) United States Patent
Kang et al.

(10) Patent No.: US 8,709,642 B2
(45) Date of Patent: Apr. 29, 2014

(54) STACK AND FOLDING-TYPED ELECTRODE ASSEMBLY AND METHOD FOR PREPARATION OF THE SAME

(75) Inventors: Kyong Won Kang, Daejeon (KR); Hyang Mok Lee, Seoul (KR); Byungjin Choi, Daejeon (KR); Eunyoung Goh, Goyang-Si (KR); Sung-Min Hwang, Cheongju-Si (KR); Oh Young Hyun, Daejeon (KR); Chang bum Ahn, Daejeon (KR); Hyun-Chul Jung, Daejeon (KR); Wooyong Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 959 days.

(21) Appl. No.: 12/667,484

(22) PCT Filed: Jul. 2, 2008

(86) PCT No.: PCT/KR2008/003883
§ 371 (c)(1),
(2), (4) Date: Jul. 13, 2010

(87) PCT Pub. No.: WO2009/005288
PCT Pub. Date: Jan. 8, 2009

(65) Prior Publication Data
US 2010/0279161 A1 Nov. 4, 2010

(30) Foreign Application Priority Data
Jul. 4, 2007 (KR) .................. 10-2007-0066837

(51) Int. Cl.
*H01M 10/04* (2006.01)
(52) U.S. Cl.
USPC ............. 429/152; 429/94; 429/127; 429/142; 429/149; 29/623.1; 29/623.3
(58) Field of Classification Search
USPC ................. 429/127, 142, 149, 152, 94, 124; 29/623.1–623.5
See application file for complete search history.

(56) References Cited

U.S. PATENT DOCUMENTS 5,300,373 A    4/1994  Shackle
(Continued)

FOREIGN PATENT DOCUMENTS

| JP | 2002-270242 A | 9/2002 |
|---|---|---|
| KR | 10-2001-0000061 A | 1/2001 |
| KR | 10-2001-0055968 A | 7/2001 |
| KR | 10-2001-0082058 A | 8/2001 |
| KR | 10-2001-0082059 A | 8/2001 |

(Continued)

*Primary Examiner* — Jonathan G Leong
*Assistant Examiner* — James Erwin
(74) *Attorney, Agent, or Firm* — Birch, Stewart, Kolasch & Birch, LLP

(57) ABSTRACT

Disclosed herein is a method of locating a plurality of full cells constructed in a cathode/separator/anode structure, as basic units, on a separator sheet having a continuous length, further locating a unit electrode or a bi-cell on the separator sheet, and winding the full cells and unit electrode or the bi-cell to continuously manufacture a stacking/folding type electrode assembly constructed in a structure in which anodes are located at the outermost electrodes forming the outside of the electrode assembly, respectively, wherein the method including a step of continuously supplying a cathode sheet, an anode sheet, a first separator sheet, and a second separator sheet, to manufacture the unit cells, successively arranging the unit cells on the second separator sheet from a first stage to an $n^{th}$ stage, and winding the unit cells, a step of arranging cathode tabs and anode tabs at the respective stages, while the cathode tabs and the anode tabs are opposite to each other, and arranging electrode tabs having the same polarity between the neighboring stages, while the electrode tabs are opposite to each other, such that the electrode tabs having the same polarity are located all together at predetermined positions of the wound electrode assembly, and a step of supplying electrodes the number of which is odd from two electrode sheets and electrodes the number of which is even from one electrode sheet.

25 Claims, 10 Drawing Sheets

(56) References Cited

U.S. PATENT DOCUMENTS

2002/0007552 A1* 1/2002 Singleton et al. ............ 29/623.3
2002/0160258 A1 10/2002 Lee et al.
2004/0053123 A1* 3/2004 Chang et al. ................. 429/144
2005/0202314 A1* 9/2005 Cherng et al. ................ 429/130

FOREIGN PATENT DOCUMENTS

| KR | 10-2001-0082060 A | 8/2001 |
| KR | 10-2004-0068803 A | 8/2004 |
| KR | 10-2005-0066652 A | 6/2005 |
| KR | 10-2007-0020597 A | 2/2007 |

* cited by examiner

STACK AND FOLDING-TYPED ELECTRODE ASSEMBLY AND METHOD FOR PREPARATION OF THE SAME

FIELD OF THE INVENTION

The present invention relates to a method of manufacturing a stacking/folding type electrode assembly, and, more particularly, to a method of manufacturing an electrode assembly including a step of continuously supplying a cathode sheet, an anode sheet, a first separator sheet, and a second separator sheet, to manufacture the unit cells, successively arranging the unit cells on the second separator sheet from a first stage to an $n^{th}$ stage, and winding the unit cells, a step of arranging cathode tabs and anode tabs at the respective stages, while the cathode tabs and the anode tabs are opposite to each other, and arranging electrode tabs having the same polarity between the neighboring stages, while the electrode tabs are opposite to each other, such that the electrode tabs having the same polarity are located all together at predetermined positions of the wound electrode assembly, and a step of supplying electrodes the number of which is odd ('odd-numbered electrodes') from two electrode sheets and electrodes the number of which is even ('even-numbered electrodes') from one electrode sheet.

BACKGROUND OF THE INVENTION

As mobile devices have been increasingly developed, and the demand for such mobile devices has increased, the demand for batteries has also sharply increased as an energy source for the mobile devices. Accordingly, much research on batteries satisfying various needs has been carried out.

In terms of the shape of batteries, the demand for prismatic secondary batteries or pouch-shaped secondary batteries, which are thin enough to be applied to products, such as mobile phones, is very high. In terms of the material for batteries, the demand for lithium secondary batteries, such as lithium ion batteries and lithium ion polymer batteries, having high energy density, high discharge voltage, and high output stability, is very high.

Furthermore, secondary batteries may be classified based on the construction of an electrode assembly having a cathode/separator/anode structure. For example, the electrode assembly may be constructed in a jelly-roll (winding) type structure in which long-sheet type cathodes and long-sheet type anodes are wound while separators are disposed respectively between the cathodes and the anodes or in a stacking type structure in which pluralities of cathodes and anodes having a predetermined size are successively stacked while separators are disposed respectively between the cathodes and the anodes.

However, the conventional electrode assemblies have several problems.

First, the jelly-roll type electrode assembly is manufactured by densely winding the long-sheet type cathodes and the long-sheet type anodes with the result that the jelly-roll type electrode assembly is circular or elliptical in section. Consequently, stress, generated by the expansion and contraction of the electrodes during the charge and discharge of a battery, accumulates in the electrode assembly, and, when the stress accumulation exceeds a specific limit, the electrode assembly may be deformed. The deformation of the electrode assembly results in the nonuniform gap between the electrodes. As a result, the performance of the battery is abruptly deteriorated, and the safety of the battery is not secured due to an internal short circuit of the battery. Furthermore, it is difficult to rapidly wind the long-sheet type cathodes and the long-sheet type anodes while maintaining uniformly the gap between the cathodes and anodes, with the result that the productivity is lowered.

Secondly, the stacking type electrode assembly is manufactured by sequentially stacking the plurality of unit cathodes and the plurality of unit anodes. As a result, it is additionally necessary to provide a process for transferring electrode plates, which are used to manufacture the unit cathodes and the unit anodes. Furthermore, a great deal of time and effort are required to perform the sequential stacking process, with the result that the productivity is lowered.

In order to solve the problems, there has been developed a stacking/folding type electrode assembly, which is a combination of the jelly-roll type electrode assembly and the stacking type electrode assembly. The stacking/folding type electrode assembly is constructed in a structure in which pluralities of cathodes and anodes having a predetermined size are successively stacked, while separators are disposed respectively between the cathodes and the anodes, to constitute a bi-cell or a full-cell, and then a plurality of bi-cells or a plurality of full-cells are wound while the bi-cells or the full cells are located on a long separator sheet. The details of the stacking/folding type electrode assembly are disclosed in Korean Patent Application Publication No. 2001-0082058, No. 2001-0082059, and No. 2001-0082060, which have been filed in the name of the applicant of the present patent application.

FIGS. 1 and 2 typically illustrate an exemplary structure of a conventional stacking/folding type electrode assembly including such full cells as basic units and a process for manufacturing the stacking/folding type electrode assembly, respectively.

Referring to these drawings, a plurality of full cells 10, 11, 12, 13, 14 . . . , as unit cells, constructed in a structure in which a cathode, a separator, and an anode are sequentially arranged are stacked such that a separator sheet 20 is disposed between the respective full cells. The separator sheet 20 has unit lengths sufficient to surround the respective full cells. The separator sheet 20 is bent inward every unit length to successively surround the respective full cells from the central full cell 10 to the outermost full cell 14. Then end of the separator sheet 20 is finished by thermal welding or an adhesive tape 25.

The stacking/folding type electrode assembly is manufactured, for example, by arranging the full cells 10, 11, 12, 13, 14 . . . on the long separator sheet 20 and sequentially winding the full cells 10, 11, 12, 13, 14 . . . from one end 21 of the separator sheet 20.

When carefully observing the array combination of the full cells as the unit cells, the first full cell 10 and the second full cell 11 are spaced from each other by a distance equivalent to the width corresponding to at least one full cell. Consequently, during the winding process, the outside of the first full cell 10 is surrounded by the separator sheet 20, and then, a lower electrode of the first full cell 10 comes into contact with an upper electrode of the second full cell 11.

During the sequential stacking of the second full cell and the following full cells 11, 12, 13, 14 . . . through the winding, the surrounding length of the separator sheet 20 increases, and therefore, the full cells are arranged such that the distance between the full cells gradually increases in the winding direction.

Also, during the winding of the full cells, it is required for cathodes of the full cells to face anodes of the corresponding full cells. Consequently, the first full cell 10 and the second full cell 11 are full cells of which the upper electrode is a cathode, the third full cell 12 is a full cell of which the upper electrode is an anode, the fourth full cell 13 is a full cell of which the upper electrode is a cathode, and the fifth full cell 14 is a full cell of which the upper electrode is an anode. That is, except the first full cell 10, the full cells of which the upper electrode is a cathode and the full cells of which the upper electrode is an anode are alternately arranged.

Consequently, the stacking/folding type electrode assembly considerably makes up for the defects of the jelly-roll type electrode assembly and the stacking type electrode assembly. However, it is preferred that the number of the anodes included in the electrode assembly be greater than the number of the cathodes included in the electrode assembly to prevent the dendritic growth at the anodes. When the electrode assembly is manufactured in a structure in which the anodes are located at the outermost electrodes of the electrode assembly while cathode tabs and anode tabs are opposite to each other, the total number of the unit electrodes is odd for any one electrode of the single electrode assembly. Consequently, when electrode assemblies are manufactured through a series of successive processes, such an odd-numbered electrode is left by one during the manufacture of each electrode assembly. As a result, the unit electrodes are inevitably wasted, and therefore, the manufacturing costs of the electrode assembly increase.

In conclusion, the stacking/folding type electrode assembly is preferred in the aspect of operational performance and safety of the battery. However, the stacking/folding type electrode assembly is disadvantageous in the aspect of manufacturing costs and productivity of the battery. Consequently, there is a high necessity for a method of manufacturing an electrode assembly that is capable of providing higher productivity and operational performance of the battery while making up for the above-mentioned defects.

Furthermore, the latest Bluetooth-based mobile devices require a very small-sized secondary battery. Consequently, there is a high necessity for a technology to manufacture a very small-sized electrode assembly using full cells as basic units at low costs and high productivity.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have found that, when continuously supplying electrode sheets and separator sheets to manufacture unit cells, successively arranging the unit cells on the separator sheet, winding the unit cells, constructing the electrode assembly such that the electrode tabs having the same polarity are located all together at predetermined positions of the wound electrode assembly, and supplying electrodes the number of which is odd from two electrode sheets and electrodes the number of which is even from one electrode sheet, to manufacture an electrode assembly constructed in a structure in which anodes are located at the outermost electrodes of the electrode assembly, it is possible to fundamentally prevent the loss of electrodes, thereby greatly reducing the manufacturing costs of the electrode assembly, and, furthermore, when supplying and arranging unit cells used to manufacture the electrode assembly through a series of successive processes, it is possible to maximize production efficiency. The present invention has been completed based on these findings.

In accordance with one aspect of the present invention, the above and other objects can be accomplished by the provision of a method of locating a plurality of full cells constructed in a cathode/separator/anode structure, as basic units, on a separator sheet having a continuous length, further locating a unit electrode or a bi-cell on the separator sheet, and winding the full cells and unit electrode or the bi-cell to continuously manufacture a stacking/folding type electrode assembly constructed in a structure in which anodes are located at the uppermost and lowermost electrodes (the outermost electrodes) forming the outside of the electrode assembly, respectively, wherein the method comprising: continuously supplying an electrode sheet (a cathode sheet) to which a cathode active material is applied, an electrode sheet (an anode sheet) to which an anode active material is applied, a separator sheet (a first separator sheet) disposed between a cathode and an anode of a full cell or a bi-cell, and another separator sheet (a second separator sheet) used to wind unit cells (the full cells, the unit electrode, and the bi-cell), to manufacture the unit cells, successively arranging the unit cells on the second separator sheet from a first stage to an $n^{th}$ stage, and winding the unit cells; arranging cathode tabs and anode tabs at the respective stages, while the cathode tabs and the anode tabs are opposite to each other, and arranging electrode tabs having the same polarity between the neighboring stages, while the electrode tabs are opposite to each other, such that the electrode tabs having the same polarity are located all together at predetermined positions of the wound electrode assembly; and supplying electrodes the number of which is odd ('odd-numbered electrodes') from two electrode sheets and electrodes the number of which is even ('even-numbered electrodes') from one electrode sheet.

When an electrode assembly is manufactured by the above-described method, although the electrode assembly is constructed in a structure in which full cells are used as basic units, and electrode tabs are opposite to each other, electrodes of which the number is odd are supplied from two electrode sheets, and therefore, it is possible to manufacture the electrode assembly in a series of successive processes while preventing the loss of electrodes, thereby greatly improving production efficiency and greatly reducing the manufacturing costs of the electrode assembly.

In this specification, the term 'unit electrode' means an electrode of a cathode or anode structure. Consequently, when the unit electrode itself constitutes a unit cell, the unit cell means the one including only one electrode, not of a full cell or bi-cell structure. When a unit cell at a specific stage is a unit cell, the unit cell itself may be a lower electrode (an electrode contacting a separator sheet) and, at the same time, an upper electrode.

Therefore, except in a case which will be particularly described hereinafter with discrimination, the term 'lower electrode' or 'upper electrode' is used as a concept including a unit electrode itself as well as a lower electrode or an upper electrode of a full cell or a bi-cell.

Also, in this specification, the term 'single electrode' means an electrode to be cut from an electrode sheet into a predetermined size to manufacture a unit cell or an electrode cut from the electrode sheet. In this case, the single electrode may be used as a cathode or an anode cut into a predetermined size to manufacture a full cell or a bi-cell as a unit cell. Alternatively, the signal electrode itself may be used as a unit electrode of a unit cell.

The full cell, as the basic unit, is not particularly restricted so long as the full cell is constructed in a structure in which the upper electrode and the lower electrode of the unit cell have different polarities. For example, the full cell may be constructed in i) a cathode/separator/anode stacking structure or ii) a cathode/separator/anode/separator/cathode/separator/ anode stacking structure. Preferably, the full cell is constructed in a cathode/separator/anode stacking structure. The number of full cells wound while the full cells are located on the second separator sheet may be decided based on various factors, such as the structures of the respective full cells, required capacity of a finally manufactured battery, etc. Preferably, the number of the full cells is 6 to 30.

The bi-cell means a unit cell constructed in a structure in which the same electrodes are located at opposite sides thereof, e.g., a cathode/separator/anode/separator/cathode stacking structure or an anode/separator/cathode/separator/anode stacking structure. The number of the cathodes, the anodes, and the separators constituting the bi-cell is not particularly restricted so long as the electrodes located at the opposite sides of the cell have the same polarity. The bi-cell may be classified as a unit cell (C-type bi-cell) constructed in an anode/separator/cathode/separator/anode stacking structure, i.e., a structure in which the anodes are located at the opposite sides of the cell, or a unit cell (A-type bi-cell) constructed in a cathode/separator/anode/separator/cathode stacking structure, i.e., a structure in which the cathodes are located at the opposite sides of the cell. A representative example of the C-type bi-cell is illustrated in FIG. 3.

As will be described hereinafter, the number of cathodes or anodes must be odd in consideration of the structural characteristics in that the anodes are located at the outermost electrodes of the unit cell. Consequently, the unit electrode or the bi-cell must constitute at least one unit cell. At this time, the unit electrode or the bi-cell is preferably located at the first stage, which is a winding start point, the $n-1^{th}$ stage, which is a winding end point, or the $n^{th}$ stage, in order to improve efficiency in manufacturing the unit electrode or the bi-cell. In consideration of a practical effect applicable to an actual manufacturing process, the unit electrode is more preferably located at the selected stage.

The electrode assembly according to the present invention is constructed in a structure in which the anodes are located at the outermost electrodes constituting the outside of the electrode assembly such that the anodes occupy relatively large area if possible. Consequently, for example, for a lithium secondary battery, it is possible to maximally retrain the dendritic growth of lithium metal at the anodes during the charge and discharge of the battery.

To this end, a unit electrode which is an anode or a full cell or a bi-cell the lower electrode of which is an anode is preferably arranged at the $n-1^{th}$ stage, which is a winding end point, and the $n^{th}$ stage on the second separator sheet having a continuous length.

Specifically, when a winding process is carried out in a fashion in which the second separator sheet is bent inward for each unit cell such that the unit cells are surrounded by the second separator sheet from the unit cell at the first stage to the unit cell at the $n^{th}$ stage, the lower electrode of the unit cell located at the $n-1^{th}$ stage constitutes the uppermost electrode of the electrode assembly, and the lower electrode of the unit cell located at the $n^{th}$ stage constitutes the lowermost electrode of the electrode assembly. Consequently, the anodes are located at the outermost electrodes of the electrode assembly.

Also, when the unit cells are wound while being located on the second separator sheet according to the present invention, the separator sheet is disposed between the respective unit cells. Consequently, it is required that the respective unit cells be stacked such that the cathodes and the corresponding anodes face each other while the second separator sheet is disposed between the respective unit cells.

To this end, it is required that the first unit cell lie on the top of the second unit cell while the first unit cell is surrounded by the second separator sheet, and opposite electrodes of the first and second unit cells have opposite electrode structures at a region defined between the first unit cell and the second unit cell.

In order to satisfy the first condition, a spacing region corresponding to the size of a unit cell must be formed between the first stage on the second separator sheet where the first unit cell is located and the second stage where the second unit cell is located, or a spacing region corresponding to the size of a unit cell must be formed in front of the first stage on the second separator sheet where the first unit cell is located. Consequently, during the winding process, the first unit cell lies on the top of the second unit cell while the first unit cell is surrounded by the second separator sheet.

In order to satisfy the second condition, it is required to decide the arrangement of the lower electrodes and the upper electrodes of the unit cells in consideration of the position of the spacing region. For example, when the winding process is carried out while the spacing region is formed between the first stage and the second stage, it is required that the electrode assembly be constructed in a structure in which the lower electrode of the first unit cell and the upper electrode of the second unit cell have opposite polarities, the lower electrode of the second unit cell and the upper electrode of the fourth unit cell have opposite polarities, and the lower electrode of the third unit cell and the upper electrode of the fifth unit cell have opposite polarities. On the other hand, when the winding process is carried out while the spacing region is formed in front of the first stage, it is required that the electrode assembly be constructed in the same structure as in the above-described structure except that the upper electrode of the first unit cell and the upper electrode of the second unit cell have opposite polarities.

In consideration of the above-mentioned facts, when the full cell is arranged at the first stage of the second separator sheet (i.e., the first unit cell is a full cell), it is preferred that the full cells be alternately arranged at the second and subsequent stages such that upper and lower electrodes of the neighboring unit cells between the neighboring unit cells have opposite polarities. On the other hand, when the unit electrode is arranged at the first stage, it is preferred that the full cells be arranged at the second and subsequent stages in the same electrode orientation fashion such that upper and lower electrodes of the neighboring unit cells between the neighboring unit cells have the same polarity.

When the full cell is arranged at the first stage, for example, a unit electrode which is an anode or a C-type bi-cell may be arranged at the $n^{th}$ stage such that the anodes are located at the lower electrodes at the $n-1^{th}$ stage and the $n^{th}$ stage. At this time, in a structure in which the spacing region is formed in front of the first stage, a unit electrode which is an anode may be arranged at the $n^{th}$ stage, when the lower electrode of the full cell at the first stage is an anode and the number of the full cell arranged is odd and when the lower electrode of the full cell at the first stage is a cathode and the number of the full cell arranged is even. On the other hand, a C-type bi-cell may be arranged at the $n^{th}$ stage, when the lower electrode of the full cell at the first stage is an anode and the number of the full cell arranged is even and when the lower electrode of the full cell at the first stage is a cathode and the number of the full cell arranged is odd.

In the above description, the winding process is performed while the spacing region is formed in front of the first stage. On the other hand, when the winding process is performed while the spacing region is formed between the first stage and the second stage, the same structure may be applied while the full cell at the first stage is turned over such that the upper and lower electrodes of the full cell at the first stage are reversed.

Meanwhile, when the unit electrode is arranged at the first stage on the second separator sheet, the same structure is applied irrespective of the position of the spacing region. Specifically, in order that anodes are located at the lower electrodes of the $n^{th}$ stage and the $n-1^{th}$ stage when the unit electrode is arranged at the first stage, the full cells of which the lower electrodes are cathodes are arranged at the second and subsequent stages in the same electrode orientation fashion when a cathode, as the unit electrode, is arranged at the first stage. On the other hand, when an anode, as the unit electrode, is arranged at the first stage, the full cells of which the lower electrodes are anodes are arranged at the second and subsequent stages in the same electrode orientation fashion.

In the above-described definition, the structure in which the electrode tabs having the same polarities are located all together at the predetermined positions of the electrode assembly wound means, for example, the structure in which the cathode tabs are located all together at the right-side upper end of the electrode assembly and the anode tabs are located all together at the left-side upper end of the electrode assembly, whereby the electrode tabs are coupled to a cathode lead and an anode lead, respectively. To this end, as previously defined, the cathode tabs and the anode tabs are arranged such that the cathode tabs and the anode tabs are opposite to each other at each stage of the second separator sheet, e.g., the cathode tabs and the anode tabs are arranged at the right-side upper ends and the left-side upper ends, and the electrode tabs having the same polarity are arranged between the neighboring stages such that the electrode tabs are opposite to each other. Consequently, when the cathode tab is located at the right-side upper end and the anode tab is located at the left-side upper end at an arbitrary stage, the cathode tab is located at the left-side upper end and the anode tab is located at the right-side upper end at its neighboring stage.

In the present invention, the odd-numbered electrodes (e.g. the cathodes) are supplied from two electrode sheets. Supply units for supplying the electrode sheets are not particularly restricted. For example, the supply units for the odd-numbered electrodes may be disposed above and below, or on the left and right side of, a supply unit for the even-numbered electrodes (e.g. the anodes) supplied from one electrode sheet. Also, separator sheet supply units may be disposed between the odd-numbered electrode sheets and the even-numbered electrode sheet.

In a preferred embodiment, the manufacturing method according to the present invention further comprises: (1) applying electrode active materials to electrode current-collector sheets having a continuous length, excluding regions where tabs will be formed, to manufacture electrode sheets, the electrode sheets including one electrode sheet of which the number of electrodes is even ('even-numbered electrode sheet') and two electrode sheets of which the number of electrodes is odd ('odd-numbered electrode sheets'); (2) punching the regions where the tabs will be formed of the electrode sheets manufactured at Step (1) to form electrode tabs; (3) supplying the odd-numbered electrode sheets, among the electrode sheets of which the electrode tabs are formed at Step (2), through two supply units, respectively, and supplying the even-numbered electrode sheet and the first separator sheet through respective supply units, to manufacture single electrodes of a predetermined size and separators of a predetermined size; (4) forming unit cells, which constitutes the electrode assembly, using the single electrodes and the separators manufactured at Step (3) and arranging the unit cells on the second separator sheets having a continuous length in a predetermined orientation fashion; and (5) winding the unit cell located at the first stage with the second separator sheet once, and folding the second separator sheet from the second unit cells toward the outside where the neighboring unit cell is located such that the remaining unit cells are piled one above another.

According to circumstances, Step (3) and Step (4) may be simultaneously carried out.

At Step (1), the regions where tabs will be formed of each electrode sheet are not particularly restricted. Preferably, the tabs are formed at the left and right sides of the top of a single electrode cut into a predetermined size.

Also, the electrode tabs having the same polarities are opposite to each other between the neighboring stages such that the electrode tabs having the same polarities are located all together at predetermined positions of the electrode assembly wound. Preferably, the even-numbered electrode sheet is constructed in a structure in which two single electrodes formed at the position where the electrode tabs are symmetrically arranged at the neighboring stages are repeatedly formed in pairs. Consequently, single electrodes of which the tab directions are symmetrical are sequentially supplied to unit cells, whereby the electrode tabs having the same polarities are opposite to each other between the neighboring stages.

In a preferred embodiment, the two odd-numbered electrode sheets include a first electrode sheet constructed in a structure in which single electrodes of which all electrode tabs are arranged in the same direction are successively formed and a second electrode sheet constructed in a structure in which single electrodes of which all electrode tabs are arranged in opposite directions are successively formed, the first electrode sheet and the second electrode sheet being supplied through a first supply unit and a second supply unit, respectively.

At this time, in order to arrange the cathode tab and the anode tab such that the cathode tab and the anode tab are opposite to each other at each stage, it is required that the electrode tab direction of the single electrode located at the first stage of each odd-numbered electrode sheet be opposite to the electrode tab direction of the single electrode located at the first stage of the even-numbered electrode sheet. To this end, it is preferred that the first electrode sheet and the second electrode sheet be alternately supplied beginning with the electrode sheet of which the electrode tabs are formed at the positions opposite to the electrode tab direction of the single electrode located at the first stage of the even-numbered electrode sheet.

In another preferred embodiment, the two odd-numbered electrode sheets include an electrode sheet ('a main electrode sheet') constructed in a structure in which two single electrodes of which electrode tabs are arranged in opposite directions are successively formed in pairs and another electrode sheet ('a subsidiary electrode sheet') constructed in a structure in which single electrodes of which electrode tabs are arranged in the same direction as the electrode tab of the electrode formed at the start point of the main electrode sheet are successively formed, the main electrode sheet and the subsidiary electrode sheet being supplied through a first supply unit and a second supply unit, respectively.

At this time, the second supply unit may supply the single electrode to the unit cell located at the first stage or the $n^{th}$ stage, and the first supply unit may sequentially supply the single electrodes of which the tab directions are symmetrical to the remaining unit cells.

At Step (1), the electrode active material is applied to each electrode current-collector sheet having a continuous length, excluding regions where tabs will be formed, to manufacture an electrode sheet on which single electrodes are successively formed. The single electrodes are classified into cathodes and anodes.

Each cathode is manufactured, for example, by applying, drying, and pressing a mixture of a cathode active material, a conducting agent, and a binder to a cathode current collector, excluding regions where tabs will be formed. According to circumstances, a filler may be added to the mixture.

Generally, the cathode current collector has a thickness of 3 to 500 μm. The cathode current collector is not particularly restricted so long as the cathode current collector has high conductivity while the cathode current collector does not induce any chemical change in the battery. For example, the cathode current collector may be made of stainless steel, aluminum, nickel, titanium, or plastic carbon. Alternatively, the cathode current collector may be made of aluminum or stainless steel the surface of which is treated with carbon, nickel, titanium, or silver. The cathode current collector may have micro concavo-convex parts formed at the surface thereof so as to increase the attaching force of the cathode active material. The cathode current collector may be constructed in various forms, such as a film, a sheet, a foil, a net, a porous body, a foam body, and a non-woven fabric body.

For a lithium secondary battery, the cathode active material may be, but is not limited to, a layered compound, such as lithium cobalt oxide ($LiCoO_2$) or lithium nickel oxide ($LiNiO_2$) or a compound replaced by one or more transition metals; lithium manganese oxide represented by a chemical formula $Li_{1+x}Mn_{2-x}O_4$ (where, x=0 to 0.33) or lithium manganese oxide, such as $LiMnO_3$, $LiMn_2O_3$, or $LiMnO_2$; lithium copper oxide ($Li_2CuO_2$); vanadium oxide, such as $LiV_3O_8$, $LiFe_3O_4$, $V_2O_5$, or $Cu_2V_2O_7$; Ni-sited lithium nickel oxide represented by a chemical formula $LiNi_{1-x}M_xO_2$ (where, M=Co, Mn, Al, Cu, Fe, Mg, B, or Ga, and x=0.01 to 0.3); lithium manganese composite oxide represented by a chemical formula $LiMn_{2-x}M_xO_2$ (where, M=Co, Ni, Fe, Cr, Zn, or Ta, and x=0.01 to 0.1) or a chemical formula $Li_2Mn_3MO_8$ (where, M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conducting agent is generally added such that the conducting agent has 1 to 50 weight percent based on the total weight of the compound including the cathode active material. The conducting agent is not particularly restricted so long as the conducting agent has high conductivity while the conducting agent does not induce any chemical change in the battery. For example, graphite, such as natural graphite or artificial graphite; carbon blacks, such as carbon black, acetylene black, Ketjen black, channel black, furnace black, lamp black and thermal black; conductive fibers, such as carbon fibers and metallic fibers; metallic powders, such as carbon fluoride powder, aluminum powder and nickel powder; conductive whiskers, such as zinc oxide and potassium titanate; conductive metal oxides, such as titanium oxide; and polyphenylene derivatives may be used as the conducting agent.

The binder for the cathode active material is a component assisting in binding between the active material and conductive agent, and in binding with the current collector. The binder according to the present invention is typically added in an amount of 1 to 50 weight % based on the total weight of the compound including the cathode active material. As examples of the binder, there may be used polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the cathode. There is no particular limit to the filler so long as it does not cause chemical changes in the battery and is a fibrous material. As examples of the filler, there may be used olefin polymers, such as polyethylene and polypropylene; and fibrous materials, such as glass fiber and carbon fiber.

On the other hand, the anode is manufactured by applying, drying, and pressing an anode active material to an anode current collector, excluding regions where tabs will be formed. According to circumstances, the conducting agent, the binder, and the filler, which were previously described, may be selectively added to the anode active material.

Generally, the anode current collector has a thickness of 3 to 500 μm. The anode current collector is not particularly restricted so long as the anode current collector has high conductivity while the anode current collector does not induce any chemical change in the battery. For example, the anode current collector may be made of copper, stainless steel, aluminum, nickel, titanium, or plastic carbon. Alternatively, the anode current collector may be made of copper or stainless steel the surface of which is treated with carbon, nickel, titanium, or silver, or an aluminum-cadmium alloy. Like the cathode current collector, the anode current collector may have micro concavo-convex parts formed at the surface thereof so as to increase the attaching force of the anode active material. The anode current collector may be constructed in various forms, such as a film, a sheet, a foil, a net, a porous body, a foam body, and a non-woven fabric body.

As the anode active material, for example, there may be used carbon, such as non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, and 3 elements of the periodic table, halogen; $0 \leq x \leq 1$; $1 \leq y \leq 3$; $1 \leq z \leq 8$); lithium metal; lithium alloy; silicon-based alloy; tin-based alloy; metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer, such as polyacetylene; or a Li—Co—Ni based material.

The materials for the first separator sheet, disposed between the cathode and the anode of the full cell or the bi-cell, and the second separator sheet, used to wind the unit cells (the full cells, the unit electrode, and the bi-cell) are not particularly restricted so long as the first separator sheet and the second separator sheet exhibit high insulation and are constructed in a porous structure in which the movement of ions is possible. The separator and the separator sheets may be made of the same material or different materials.

As each separator sheet, for example, an insulative thin film having high ion permeability and high mechanical strength may be used. The separator sheet typically has a pore diameter of 0.01 to 10 μm and a thickness of 5 to 300 μm. As the material for the separator sheet, sheets or non-woven fabrics made of an olefin polymer, such as polypropylene, which has chemical resistance and hydrophobicity, glass fibers, or polyethylene, are used. When a solid electrolyte, such as a polymer, is employed as the electrolyte, the solid electrolyte may also serve as both the separator and the electrolyte. Preferably, the separator sheet is made of polyethylene film, polypropylene film, multi-layer film manufactured by a combination of the polyethylene film and the polypropylene film, or polymer film for a polymer electrolyte or a gel-type polymer electrolyte, such as polyvinylidene fluoride, polyethylene oxide, polyacrylonitrile, or polyvinylidene fluoride hexafluoropropylene copolymer.

The first separator sheet preferably has an adhesive function due to thermal welding to constitute a full cell or a bi-cell. On the other hand, the second separator sheet does not necessarily have such an adhesive function; however, it is preferred for the second separator sheet to have an adhesive function to easily perform a winding process. In a preferred embodiment, the separator sheets are made of polymer film for a polymer electrolyte, having an adhesive function due to thermal welding, which includes a first polymer layer of micro porosity and a second polymer layer obtained by gelling polyvinylidene fluoride chlorotrifluoroethylene copolymer, disclosed in Korean Patent Application No. 1999-57312 filed in the name of the applicant of the present application.

Also, the second separator sheet may have a length extended to surround the electrode assembly once after the winding, and the outermost end of the sheet may be fixed by thermal welding or an adhesive tape. For example, a thermal welding device or a heat plate may be brought into contact with the separator sheet to be finished such that the separator sheet itself is welded by heat and then fixed. Consequently, the pressure is continuously maintained, and therefore, stable interface contact between the electrode and the separator sheet is achieved.

In accordance with one aspect of the present invention, there is provided an electrode assembly manufactured by the method as described above, wherein a plurality of full cells, as basic units, and a unit electrode or a bi-cell are stacked while a separator sheet is disposed therebetween, anodes are located at the outermost electrodes of the electrode assembly, and electrode tabs having the same polarity are located all together at predetermined positions.

The electrode assembly according to the present invention can be manufactured at low costs and high production efficiency. Also, the electrode assembly is constructed in a structure in which anodes constitute the outermost electrodes of the assembly, and therefore, the anodes occupy relatively large area. As a result, it is possible to maximally retrain the dendritic growth at the anodes and achieve effective spatial utilization. Consequently, the electrode assembly according to the present invention exhibits a high operational efficiency and safety even after the electrode assembly is used for a long period of time. In particular, it is possible to maximize the contents of electrode active materials, thereby implementing a highly integrated battery having a relatively small size.

Also, the electrode assembly is constructed in a structure in which unit cells are continuously surrounded by a separator sheet from a unit cell at a first stage to the outermost unit cell. In the conventional art, during the repetitive charge and discharge of the battery, the interface contact between the electrodes and the separator sheet is not maintained, with the result that the capacity and the operational performance of the battery are rapidly deteriorated. Consequently, pressure is required to stably press the interface such that the interface contact can be continuously maintained. In the electrode assembly with the above-stated construction according to the present invention, when the full cells are stacked, the separator sheet is disposed between the respective full cells, with the result that it is possible to effectively use the electrodes between the full cells. Also, the pressure generated when winding the separator sheet presses the interface between the electrodes of the cells and the separator sheet, and therefore, the electrode assembly according to the present invention is very excellent in the aspect of the operational performance and safety of the battery.

The electrode assembly is constructed in a structure in which electrode tabs having the same polarities are located all together at predetermined positions. For example, the electrode tabs may be located at the upper and lower ends or the left and right sides of the electrode assembly. Preferably, the electrode tabs are located at the upper end of the electrode assembly. Also, the positions of the cathode tabs and the anode tabs may be particularly restricted so long as the cathode tabs and the anode tabs are opposite to each other. For example, the cathode tabs and the anode tabs may be located vertically or laterally. Preferably, the cathode tabs and the anode tabs are located at the left-side upper end and the right-side upper end of the electrode assembly while the cathode tabs and the anode tabs are opposite to each other.

The electrode assembly according to the present invention may be applied to an electrochemical cell that produces electricity by electrochemical reaction between cathodes and anodes. Representative examples of the electrochemical cell include a super capacitor, an ultra capacity, a secondary battery, a fuel cell, various sensors, an electrolyzer, an electrochemical reactor, etc. Preferably, the electrochemical cell is a secondary battery.

The secondary battery is constructed in a structure in which a chargeable and dischargeable electrode assembly is mounted in a battery case while the electrode assembly is impregnated with an ion-containing electrolyte. In a preferred embodiment, the secondary battery is a lithium secondary battery.

The lithium secondary battery according to the present invention is preferably used as a small-sized power source mounted, particularly, in Bluetooth-based mobile devices. When the lithium secondary battery according to the present invention is applied to such applications, it is preferred for the lithium secondary battery to have small size and weight. A preferred example to reduce the weight of the secondary battery is to construct the secondary battery in a structure in which the electrode assembly is mounted in a pouch-shaped case made of an aluminum laminate sheet. The lithium secondary battery is well known in the art to which the present invention pertains, and therefore, a related description thereof will not be given.

DESCRIPTION OF DRAWINGS

The above and other objects, features and other advantages of the present invention will be more clearly understood from the following detailed description taken in conjunction with the accompanying drawings, in which:

FIGS. 4 and 5 are views illustrating structures in which unit cells are alternately arranged on a second separator sheet while full cells are located at a first end of the second separator sheet, wherein FIG. 4 is a view illustrating structures in which the lower electrodes of the full cells located at the first end of the second separator sheet are anodes, and FIG. 5 is a view illustrating structures in which the lower electrodes of the full cells located at the first end of the second separator sheet are cathodes;

FIGS. 6 and 7 are views illustrating structures in which unit cells are alternately arranged on a second separator sheet while unit electrodes are located at a first end of the second separator sheet, wherein FIG. 6 is a view illustrating structures in which the unit electrodes located at the first end of the second separator sheet are cathodes, and FIG. 7 is a view illustrating structures in which the unit electrodes located at the first end of the second separator sheet are anodes;

DETAILED DESCRIPTION OF PREFERRED EMBODIMENTS

Figure 1:
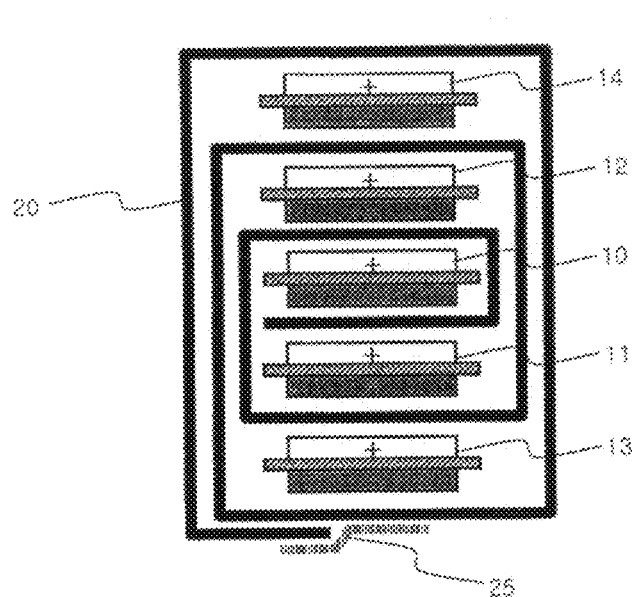
FIG. 1 is a typical view illustrating an exemplary structure of a conventional stacking/folding type electrode assembly.
Figure 2:
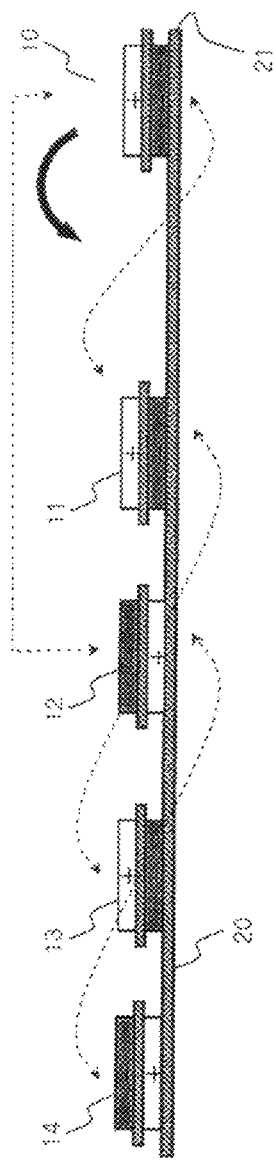
FIG. 2 is a typical view illustrating an exemplary array combination of unit cells in a process for manufacturing the stacking/folding type electrode assembly of FIG. 1.
Figure 3:
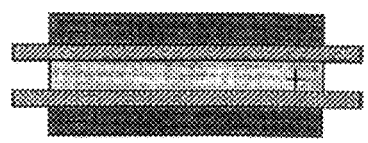
FIG. 3 is a typical view illustrating an exemplary C-type bi-cell that can be used as a bi-cell in an electrode assembly according to the present invention.

Now, preferred embodiments of the present invention will be described in detail with reference to the accompanying drawings. It should be noted, however, that the scope of the present invention is not limited by the illustrated embodiments.

FIGS. 4 to 7 typically illustrate examples in which unit cells are sequentially arranged on a second separator sheet from a first stage to an $n^{th}$ stage to manufacture an electrode assembly according to preferred embodiments of the present invention. For reference, symbols (+) and (−) of each unit cell indicate a cathode and an anode, respectively, and the positions of the cathode and the anode indicates the directions of electrode tabs. Also, a full cell, as a basic unit, is constructed in a cathode/separator/anode structure, and a bi-cell is a C-type bi-cell (anode/separator/cathode/separator/anode).

Referring to these drawings, a predetermined spacing region is located between one end of the second separator sheet 500 and the first stage of the second separator sheet 500 where the winding starts. The spacing region has a length L sufficient to surround the top of the unit cell located at the first stage through one-time winding. The spacing region may be located between the first stage and the second stage. In this case, the lower electrode of the first-stage unit cell lies on the upper electrode of the second-stage unit cell while the first-stage unit cell is surrounded by the second separator sheet. Consequently, it is sufficient to only change the positions of the upper and lower electrodes in consideration of the above-mentioned respect. For example, in FIG. 4 in which the first-stage unit cell is a full cell, the first-stage full cell 111 is located on the second separator sheet 500 while the first-stage full cell 111 is turned over such that the lower electrode of the first-stage full cell 111 becomes a cathode. On the other hand, in FIG. 5 in which the first-stage unit cell is a unit electrode, the upper electrode and the lower electrode are the same. Consequently, it is not necessary to make any change although the spacing region is located between the first stage and the second stage.

Meanwhile, full cells 111 and 121 (see FIG. 4) and full cells 211 and 221 (see FIG. 5), as unit cells, or unit electrodes 311 and 321 (see FIG. 6) and unit electrodes 411 and 421 (see FIG. 7) are located at the first stages 111, 121, 211, 221, 311, 321, 411, and 421, which are winding start points. Anodes, as unit electrodes, C-type bi-cells, or full cells of which the lower electrode is an anode are located at the $n^{th}$ stage 116, 126, 215, 225, 317, 326, 416, and 425 and at the n−$1^{th}$ stage 115, 125, 214, 224, 316, 325, 415, and 424.

Consequently, the number of the anodes included in the electrode assembly is greater by one than that of the cathodes included in the electrode assembly, and the anodes are located as the respective outermost electrodes of the electrode assembly, whereby it is possible to prevent the dendritic growth of lithium ions at the surfaces of the anodes. Also, the electrode tabs of the neighboring unit cells are arranged in a symmetrical fashion, and the cathode tabs and the anode tabs of the unit cell located at each stage are opposite to each other at the left- and right-side upper ends thereof. Consequently, when the electrode assembly is manufactured by winding from the first stage, all the electrodes tabs of the same polarity are located at the same position, and the anode tabs and the cathode tabs are formed at the left- and right-side upper ends thereof, which are opposite to each other.

Consequently, in a structure in which the anodes are located at the respective outermost electrodes of the electrode assembly, the number of the cathodes or the anodes is odd, and when a plurality of same electrode assemblies are continuously manufactured through a series of successive processes, the odd-numbered electrodes do not make a pair, with the result that the electrodes are wasted.

Specifically, in structures 110, 210, 310, and 410, the electrodes of which the number of the electrode tabs is odd are cathodes, and, when the neighboring two electrodes of which the electrode tabs are formed at the left- and right-side upper ends thereof make a pair, one cathode of which the electrode tabs are formed at the right-side upper end thereof is left. On the other hand, in structures 120, 220, 320, and 420, the electrodes of which the number of the electrode tabs is odd are anodes, and, one anode of which the electrode tabs are formed at the right-side upper end thereof is left. Consequently, when a plurality of electrode assemblies are continuously manufactured through a series of successive processes, the electrodes of which the number is odd are inevitably left, with the result that the process efficiency is lowered, and the material waste is incurred. When using the manufacturing method according to the present invention, on the other hand, it is possible to supply the electrodes of which the number is odd in the form of two electrode sheets, thereby fundamentally solving the above-mentioned problems.

Hereinafter, the present invention will be described in more detail with reference to the accompanying drawings.

Figure 4:
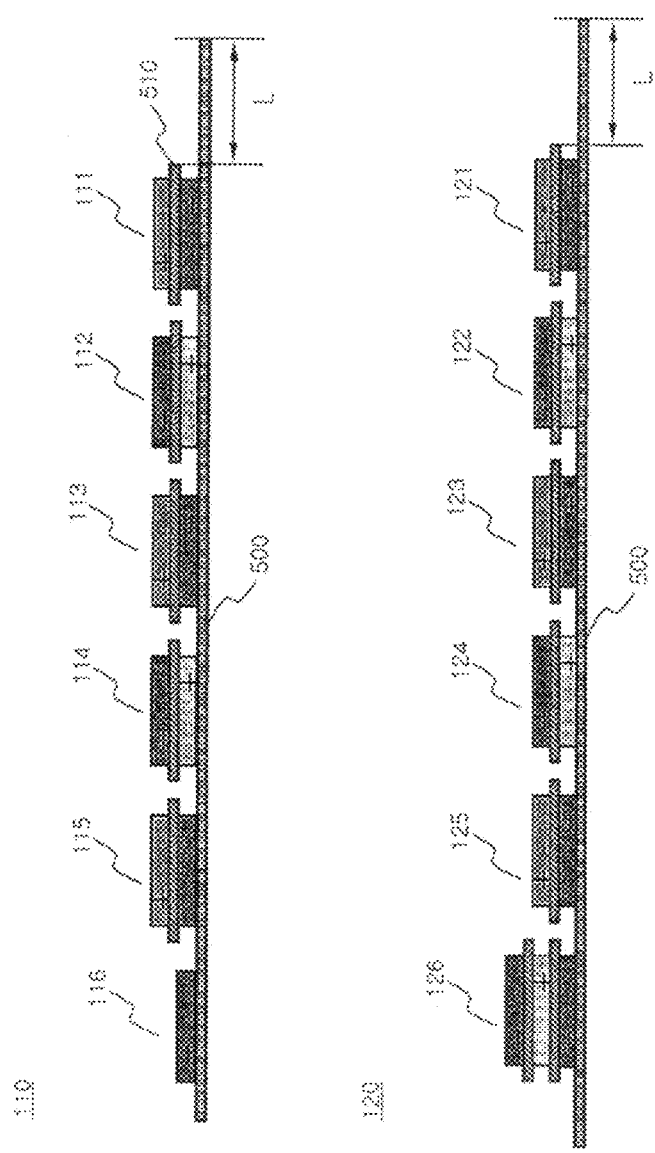
Figure 5:
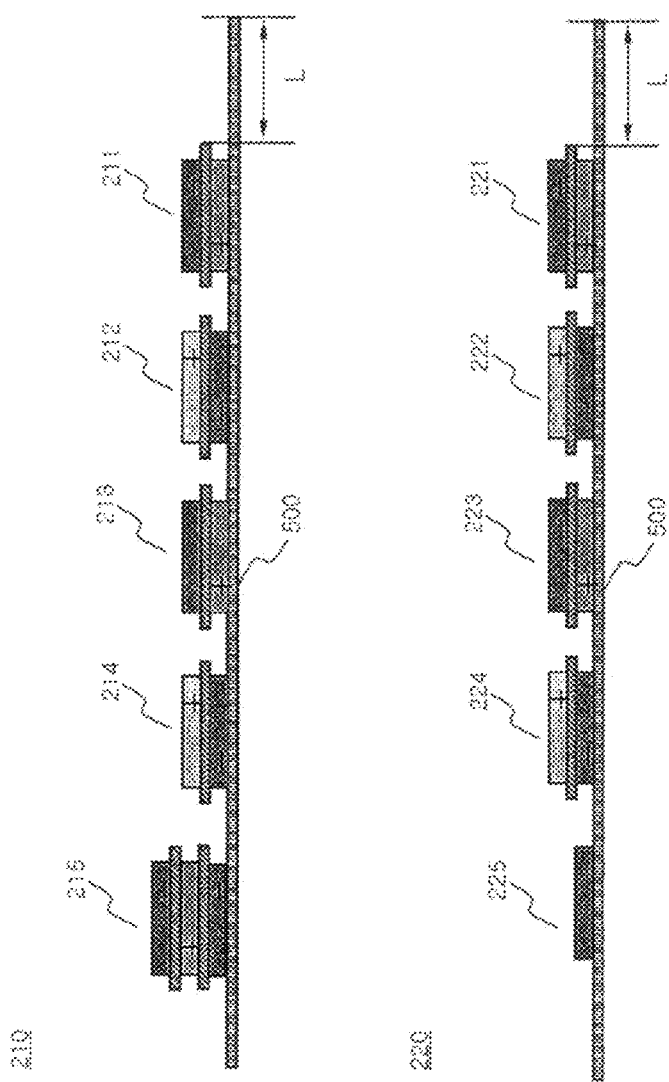

First, FIGS. 4 and 5 are views illustrating structures in which unit cells are alternately arranged on a second separator sheet 500 while full cells 111, 121, 211, and 221 are located at a first end of the second separator sheet. Specifically, FIG. 4 is a view illustrating structures in which the lower electrodes of the full cells 111 and 121 located at the first end of the second separator sheet are anodes, and FIG. 5 is a view illustrating structures in which the lower electrodes of the full cells 211 and 221 located at the first end of the second separator sheet are cathodes. Also, structures 110 and 210 are constructed such that the odd-numbered electrodes of the electrode assembly are cathodes, and structures 120 and 220 are constructed such that the odd-numbered electrodes of the electrode assembly are anodes.

Consequently, when the full cell is located at the first stage, the full cells, as the unit cells, are alternately arranged, and an anode, as a unit electrode, or a C-type bi-cell is located at the $n^{th}$ stage.

Figure 6:
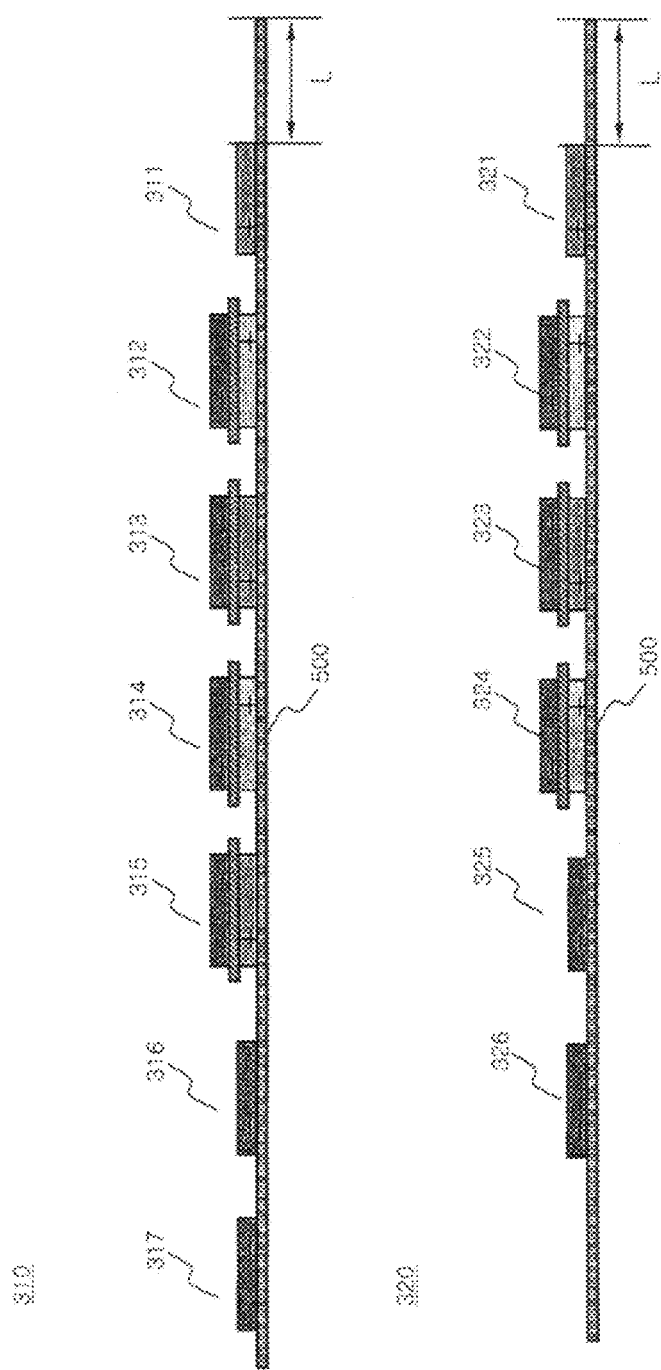
Figure 7:
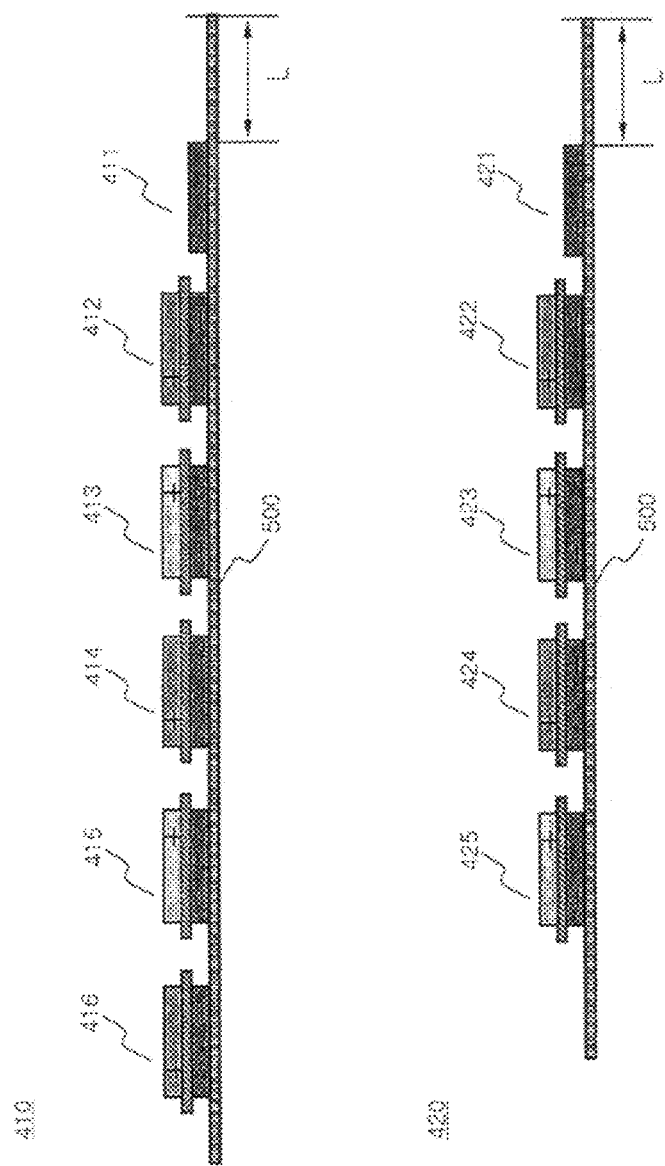

Also, FIGS. 6 and 7 are views illustrating structures in which full cells, as unit cells, are arranged in the same orientation structure while unit electrodes 311, 321, 411, and 421 are located at a first end of the second separator sheet 500. Specifically, FIG. 6 is a view illustrating structures in which the unit electrodes 311 and 321 located at the first end of the second separator sheet are cathodes, and FIG. 7 is a view illustrating structures in which the unit electrodes 411 and 421 located at the first end of the second separator sheet are anodes. Also, structures 310 and 410 are constructed such that the odd-numbered electrodes of the electrode assembly are cathodes, and structures 320 and 420 are constructed such that the odd-numbered electrodes of the electrode assembly are anodes.

Consequently, when the unit electrode is located at the first stage, the unit cells are arranged in the same orientation structure, i.e., the lower electrodes of the unit cells contacting the second separator sheet are arranged in the same structure. When the unit electrode at the first stage is a cathode, anodes, as unit electrodes, are located at the $n-1^{th}$ stage and the $n^{th}$ stage such that the anodes are located at the outermost electrodes of the electrode assembly.

Among the above-described structures, the structures 110 and 220 are particularly preferred in the aspect of the manufacturing process.

Figure 8:
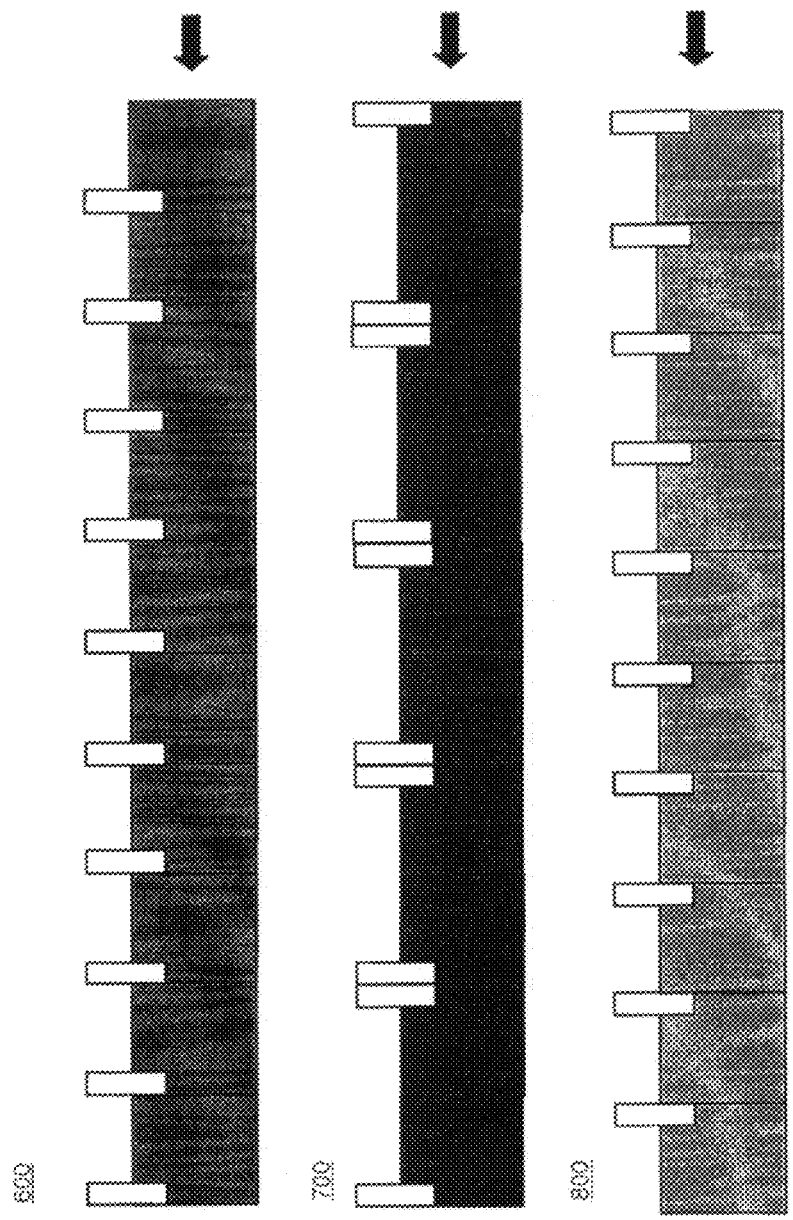
FIGS. 8 and 9 are typical views illustrating two electrode sheets supplied in the structure of an odd-numbered electrode sheet and one electrode sheet supplied in the structure of an even-numbered electrode sheet according to an embodiment of the present invention.
Figure 9:
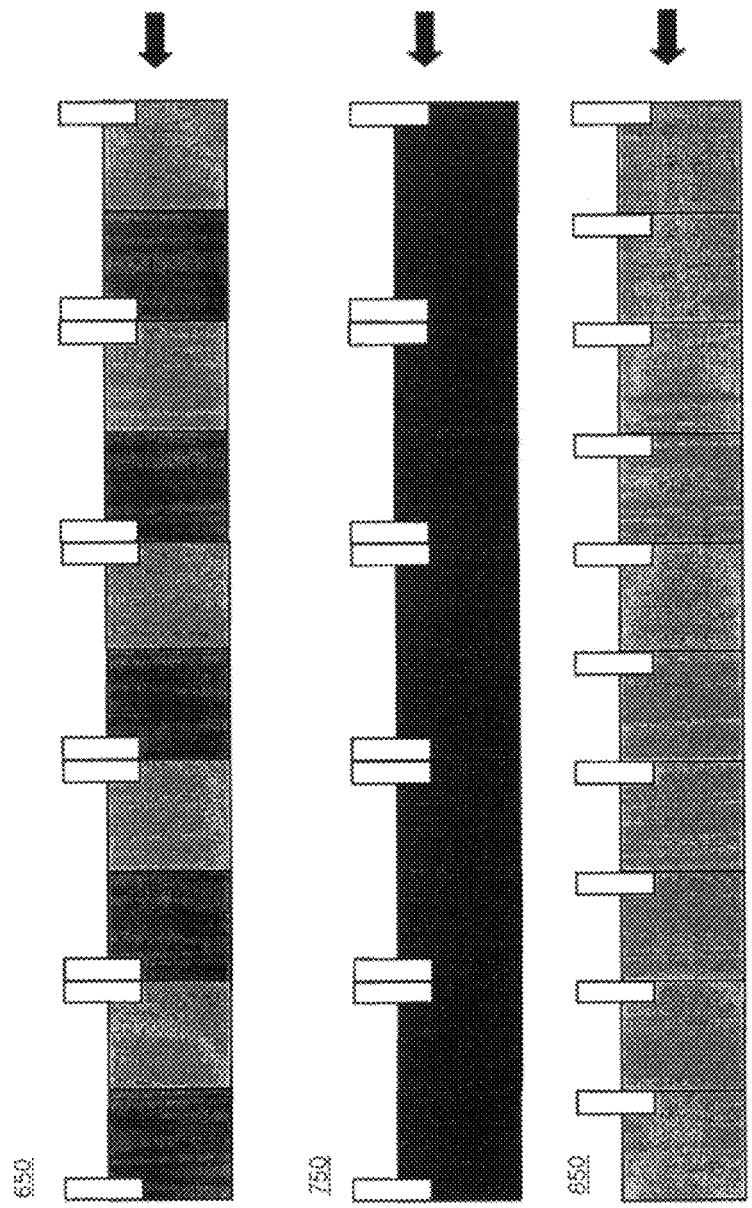

FIGS. 8 and 9 are typical views illustrating two electrode sheets supplied in the structure of an odd-numbered electrode sheet and one electrode sheet supplied in the structure of an even-numbered electrode sheet according to an embodiment of the present invention.

Referring first to FIG. 8, there are illustrated odd-numbered electrode sheets 600 and 800, i.e., a first electrode sheet 600 constructed in a structure in which single electrodes of which electrode tabs are formed at the left-side upper ends thereof are successively formed and a second electrode sheet 800 constructed in a structure in which single electrodes of which electrode tabs are formed at the right-side upper ends thereof are successively formed, and an even-numbered electrode sheet 700 constructed in a structure in which single electrodes of which electrode tabs are formed at the left-side upper ends thereof and single electrodes of which electrode tabs are formed at the right-side upper ends thereof are repeatedly formed in pairs.

The first electrode sheet 600 and the second electrode sheet 800 are supplied through separate supply units, respectively. Single electrodes are supplied from the first electrode sheet 600 constructed in a structure in which electrode tabs are formed at the left-side upper end, which is opposite to the right-side upper end, which is the tab direction of a single electrode located at the first stage of the even-numbered electrode sheet 700. Subsequently, single electrodes are supplied from the second electrode sheet 800. That is, the single electrodes are supplied in an alternating fashion. Consequently, when an electrode assembly is manufactured, electrodes of which the number of electrode tabs is odd are alternately supplied from the first electrode sheet 600 and the second electrode sheet 800. Consequently, the waste of material is prevented although electrode assemblies are continuously manufactured through a series of successive processes.

Referring to FIG. 9, odd-numbered electrode sheets 650 and 850 include a main electrode sheet 650 constructed in a structure in which single electrodes of which electrode tabs are formed at the left-side upper ends thereof and single electrodes of which electrode tabs are formed at the right-side upper ends thereof are repeatedly formed in pairs, and a subsidiary electrode sheet 850 constructed in a structure in which single electrodes of which electrode tabs are arranged in the same direction as the electrode tab of the unit electrode formed at the first stage of the main electrode sheet 650 are successively formed. An even-numbered electrode sheet 750 is constructed in the same structure as in FIG. 5. That is, the even-numbered electrode sheet 750 is constructed in a structure in which single electrodes of which electrode tabs are formed at the left-side upper ends thereof and single electrodes of which electrode tabs are formed at the right-side upper ends thereof are repeatedly formed in pairs. Consequently, the main electrode sheet 650 supplies required electrodes to the first to $n-1^{th}$ stages, whereas the subsidiary electrode sheet 850 supplies an electrode only to the $n^{th}$ stage. For this reason, most of the single electrodes are supplied from the main electrode sheet, and the remaining single electrode is supplied from the subsidiary electrode sheet 850 to make even number, whereby the waste of material is prevented during a series of successive processes.

Meanwhile, although not shown, when the subsidiary electrode sheet is constructed in a structure in which single electrodes of which electrode tabs are arranged in the direction opposite to the electrode tab of the unit electrode formed at the first stage of the main electrode sheet 650 are successively formed, a firstly required even-numbered electrode may be supplied from the subsidiary electrode sheet, and even-numbered electrodes required from the second stage to the $n^{th}$ stage may be supplied from the main electrode sheet.

Figure 10:
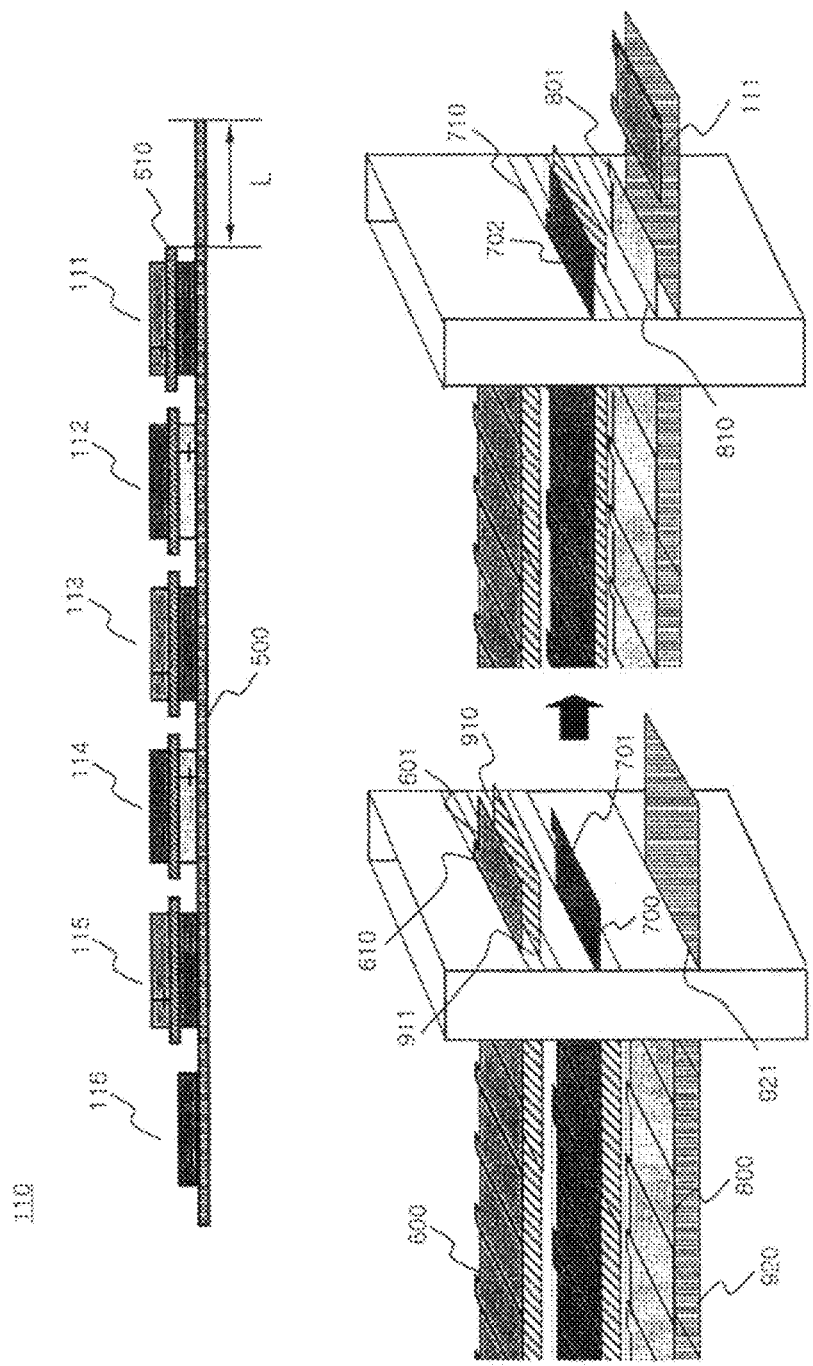
FIG. 10 is a typical view illustrating a method of manufacturing an electrode assembly, using the electrode sheets of FIG. 8 and separator sheets, in an array structure shown in FIG. 4.

FIG. 10 is a typical view illustrating a method of manufacturing an electrode assembly, using the electrode sheets of FIG. 8 and separator sheets, in an array structure shown in FIG. 4.

Electrode sheets 600, 700, and 800, a first separator sheet 910, and a second separator sheet 920 are arranged vertically. These sheets are supplied through supply units, which are also arranged vertically. Specifically, the first cathode sheet 600, the first separator sheet 910, the anode sheet 700, the first separator sheet 910, the second cathode sheet 800, and the second separator sheet 920 are arranged in order from above. These sheets are supplied through the respective supply units. The anode sheet 700 for even-numbered electrodes is constructed in a structure in which single electrodes 701 of which anode tabs are formed at the right-side upper ends thereof and single electrodes 702 of which anode tabs are formed at the left-side upper ends thereof are repeatedly formed in pairs. The anode sheet 700 is continuously supplied through an anode sheet supply unit 710. On the other hand, two cathode sheets 600 and 800 are supplied for odd-numbered electrodes. The first cathode sheet 600 is constructed in a structure in which single electrodes of which cathode tabs are formed at the left-side upper ends thereof are successively formed, and the second cathode sheet 800 is constructed in a structure in which single electrodes of which cathode tabs are formed at the right-side upper ends thereof are successively formed. The first cathode sheet 600 and the second cathode sheet 800 are alternately supplied through a first cathode sheet supply unit 610 and a second cathode sheet supply unit 810.

Two first separator sheets 910 are supplied such that the first separator sheets 910 are arranged below the anode sheet 700 and one of the cathode sheets, e.g., the cathode sheet 600. The first separator sheets 910 may be simultaneously supplied through the anode sheet supply unit 710 and the first cathode sheet supply unit 610 while the first separator sheets 910 are coupled to the anode sheet 700 and the cathode sheet 600, respectively. Alternatively, the first separator sheets 910 may be supplied through separate first separator sheet supply units 911.

Meanwhile, the second separator sheet 920 is continuously supplied through a separate second separator sheet supply unit 921.

First, a first cathode 601 having a cathode tab formed at the left-side upper end thereof is supplied from the first cathode sheet supply unit 610, and, at the same time, a first anode 101 having an anode tab formed at the right-side upper end thereof is supplied from the anode sheet supply unit 710. Also, a first separator sheet 910, which will be disposed between the first cathode 611 and the first anode 701, is supplied from the first separator sheet supply unit 911. The electrodes and the separator are stacked, while the separator is disposed between the electrodes, and arranged on a second separator sheet 920, which is supplied from the second separator sheet supply unit 921, in the form of a first full cell 111.

Subsequently, a second anode 712 having an anode tab formed at the left-side upper end thereof is supplied from the anode sheet supply unit 710, and, at the same time, a second cathode 612 having a cathode tab formed at the right-side upper end thereof is supplied from the second cathode sheet supply unit 610. A first separator sheet 910 is disposed between the second anode 712 and the second cathode 612, and this stack is arranged on the second separator sheet 920, which is continuously supplied, in the form of a second full cell. The second full cell and the first full cell 111 are arranged side by side.

In this way, cathodes, which are odd-numbered electrodes, are supplied from the two cathode sheets through two cathode sheet supply units, whereby it is possible to fundamentally prevent the waste of material.

Figure 11:
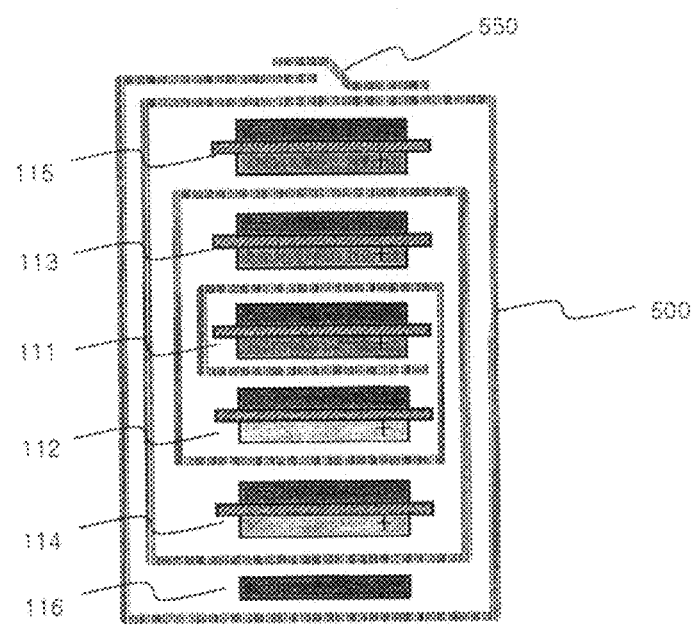
FIG. 11 is a typical view illustrating an electrode assembly manufactured by the method of FIG. 10.

FIG. 11 is a typical view illustrating an electrode assembly manufactured by the method of FIG. 10.

A third full cell 113 and a fifth full cell 115 are located above a first full cell 111. A second full cell 112, a fourth full cell 114, and a sixth-stage anode 116 are located below the first full cell 111. Consequently, all cathode tabs are located at the right side of the electrode assembly, and all anode tabs are located at the left side of the electrode assembly. The lower electrode, i.e., the anode, of the fifth full cell 115 is located at the uppermost end of the electrode assembly, and the sixth unit electrode, i.e., the anode 116, disposed at the sixth stage is located at the lowermost end of the electrode assembly. The end of the second separator sheet 500 may be finished, for example, by thermal welding or an adhesive tape 550.

Consequently, the electrode assembly is constructed in a structure in which the anodes occupy relatively large area, and therefore, it is possible to maximally retrain the dendritic growth of lithium ions at the anodes, to achieve effective spatial utilization, and to maximize the contents of electrode active materials, whereby it is possible to implement a highly integrated battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the electrode assembly manufacturing method according to the present invention is capable of fundamentally preventing the loss of electrodes, thereby greatly reducing the manufacturing costs of the electrode assembly. Also, the electrode assembly manufacturing method according to the present invention is capable of efficiently manufacturing an electrode assembly through a series of successive processes, thereby greatly improving productivity. Consequently, the electrode assembly manufactured by the electrode assembly manufacturing method according to the present invention exhibits a high operational efficiency and safety equivalent to the conventional stacking/folding type electrode assembly while the electrode assembly is manufactured with high productivity. Furthermore, anodes are located at the outermost electrodes of the electrode assembly, whereby the electrode assembly according to the present invention exhibits a high operational efficiency and safety even after the electrode assembly is used for a long period of time.

What is claimed is:

1. A method of locating a plurality of full cells constructed in a cathode/separator/anode structure, as basic units, on a separator sheet having a continuous length, further locating a unit electrode or a bi-cell on the separator sheet, and winding the full cells and either the unit electrode or the bi-cell to continuously manufacture a stacking/folding type electrode assembly constructed in a structure in which anodes are located at the outer most electrodes forming the outside of the electrode assembly, respectively, the method comprising:

continuously supplying a cathode sheet to which a cathode active material is applied, an anode sheet to which an anode active material is applied, a first separator sheet disposed between a cathode and an anode of a full cell or a bi-cell, and a second separator sheet used to wind the full cells, the unit electrode, and the bi-cell, to manufacture the unit cells, successively arranging the unit cells on the second separator sheet from a first stage to an $n^{th}$ stage, and winding the unit cells;

arranging cathode tabs all together at the right-side upper end or the left-side upper end of the electrode assembly, and arranging the anode tabs all together at the left-side upper end or the right-side upper end of the electrode assembly, arranging electrode tabs having the same polarity in a symmetrical position between the neighboring stages; and supplying an odd number of electrodes of the electrode assembly from two electrode sheets and an even number of electrodes of the electrode assembly from one electrode sheet.

2. The method according to claim 1, wherein the unit electrode or the bi-cell is located at the first stage, which is a winding start point, the $n-1^{th}$ stage, which is a winding end point, or the $n^{th}$ stage.

3. The method according to claim 2, wherein the unit electrode is located at the first stage, which is a winding start point, the $n-1^{th}$ stage, which is a winding end point, or the $n^{th}$ stage.

4. The method according to claim 1, wherein a unit electrode which is an anode, or a full cell having an anode as the lower electrode, or a bi-cell having an anode as the lower electrode, is arranged at the $n-1^{th}$ stage, which is a winding end point, and the $n^{th}$ stage on the second separator sheet.

5. The method according to claim 1, wherein the first unit cell lies on the top of the second unit cell while the first unit cell is surrounded by the second separator sheet, and opposite electrodes of the first and second unit cells have opposite electrode structures at a region defined between the first unit cell and the second unit cell.

6. The method according to claim 5, wherein a spacing region corresponding to the size of a unit cell is formed between the first stage on the second separator sheet where the first unit cell is located and the second stage where the second unit cell is located.

7. The method according to claim 5, wherein a spacing region corresponding to the size of a unit cell is formed in front of the first stage on the second separator sheet where the first unit cell is located.

8. The method according to claim 6, wherein a lower electrode of the first unit cell and an upper electrode of the second unit cell have opposite polarities, a lower electrode of the second unit cell and an upper electrode of the fourth unit cell have opposite polarities, and a lower electrode of the third unit cell and an upper electrode of the fifth unit cell have opposite polarities.

9. The method according to claim 7, wherein an upper electrode of the first unit cell and an upper electrode of the second unit cell have opposite polarities, a lower electrode of the second unit cell and an upper electrode of the fourth unit cell have opposite polarities, and a lower electrode of the third unit cell and an upper electrode of the fifth unit cell have opposite polarities.

10. The method according to claim 1, wherein the full cell is arranged at the first stage, and the full cells are alternately arranged at the second and subsequent stages such that upper and lower electrodes of the neighboring unit cells between the neighboring unit cells have opposite polarities.

11. The method according to claim 1, wherein the unit electrode is arranged at the first stage, and the full cells are arranged at the second and subsequent stages in the same electrode orientation fashion such that upper and lower electrodes of the neighboring unit cells between the neighboring unit cells have the same polarity.

12. The method according to claim 10, wherein a unit electrode which is an anode or a C-type bi-cell is arranged at the $n^{th}$ stage.

13. The method according to claim 12, wherein, in a structure in which a spacing region is formed in front of the first stage and then a winding process is carried out, when the lower electrode of the full cell at the first stage is an anode and the number of the full cell arranged is odd or when the lower electrode of the full cell at the first stage is a cathode and the number of the full cell arranged is even, a unit electrode which is an anode is arranged as the $n^{th}$ stage.

14. The method according to claim 12, wherein, in a structure in which a spacing region is foamed in front of the first stage and then a winding process is carried out, a C-type bi-cell is arranged at the $n^{th}$ stage, when the lower electrode of the full cell at the first stage is an anode and the number of the full cell arranged is even and when the lower electrode of the full cell at the first stage is a cathode and the number of the full cell arranged is odd.

15. The method according to claim 11, wherein, when a cathode, as the unit electrode, is arranged at the first stage, the full cells of which the lower electrodes are cathodes are arranged at the second and subsequent stages in the same electrode orientation fashion.

16. The method according to claim 11, wherein, when an anode, as the unit electrode, is arranged at the first stage, the full cells of which the lower electrodes are anodes are arranged at the second and subsequent stages in the same electrode orientation fashion.

17. The method according to claim 1, further comprising:
(1) applying electrode active materials to electrode current-collector sheets having a continuous length, excluding regions where tabs will be formed, to manufacture electrode sheets, the electrode sheets including one electrode sheet of which the number of electrodes is even ('even-numbered electrode sheet') and two electrode sheets of which the number of electrodes is odd ('odd-numbered electrode sheets');
(2) punching the regions where the tabs will be formed of the electrode sheets manufactured at Step (1) to form electrode tabs;
(3) supplying the odd-numbered electrode sheets, among the electrode sheets of which the electrode tabs are formed at Step (2), through two supply units, respectively, and supplying the even-numbered electrode sheet and the first separator sheet through respective supply units, to manufacture single electrodes and separators of a size equal to the unit cell;
(4) forming unit cells, which constitutes the electrode assembly, using the single electrodes and the separators manufactured at Step (3) and arranging the unit cells on the second separator sheets having a continuous length; and
(5) winding the unit cell located at the first stage with the second separator sheet once, and folding the second separator sheet from the second unit cells toward the outside where the neighboring unit cell is located such that the remaining unit cells are piled one above another.

18. The method according to claim 17, wherein the even-numbered electrode sheet is constructed in a structure in which two single electrodes formed at the position where the electrode tabs are symmetrically arranged at the neighboring stages are repeatedly formed in pairs.

19. The method according to claim 17, wherein the two odd-numbered electrode sheets include a first electrode sheet constructed in a structure in which single electrodes of which all electrode tabs are arranged in the same direction are successively formed and a second electrode sheet constructed in a structure in which single electrodes of which all electrode tabs are arranged in opposite directions are successively formed, the first electrode sheet and the second electrode sheet being supplied through a first supply unit and a second supply unit, respectively.

20. The method according to claim 18, wherein the first electrode sheet and the second electrode sheet are alternately supplied beginning with the electrode sheet of which the electrode tabs are formed at the positions opposite to the electrode tab direction of the single electrode located at the first stage of the even-numbered electrode sheet, such that the electrode tab direction of the single electrode located at the first stage of each odd-numbered electrode sheet is opposite to the electrode tab direction of the single electrode located at the first stage of the even-numbered electrode sheet.

21. The method according to claim 17, wherein the two odd-numbered electrode sheets include an electrode sheet ('a main electrode sheet') constructed in a structure in which two single electrodes of which electrode tabs are arranged in opposite directions are successively formed in pairs and another electrode sheet ('a subsidiary electrode sheet') constructed in a structure in which single electrodes of which electrode tabs are arranged in the same direction as the electrode tab of the electrode formed at the start point of the main electrode sheet are successively formed, the main electrode sheet and the subsidiary electrode sheet being supplied through a first supply unit and a second supply unit, respectively.

22. An electrode assembly manufactured by a method according to claim 1, wherein a plurality of full cells, as basic units, and a unit electrode or a bi-cell are stacked while a separator sheet is disposed therebetween, anodes are located at the outermost electrodes of the electrode assembly, and electrode tabs having the same polarity are located all together at predetermined positions.

23. An electro-chemical cell constructed including an electrode assembly according to claim 22.

24. The electro-chemical cell according to claim 23, wherein the cell is a secondary battery.

25. The method according to claim 1, further comprising supplying an odd number of electrodes from only two electrode sheets and an even number of electrodes from only one electrode sheet.

* * * * *